Jan. 1, 1935.                H. W. LEHMKUHL                1,986,403
                    METHOD FOR TESTING CHLORINE SOLUTIONS
                           Filed Jan. 25, 1932
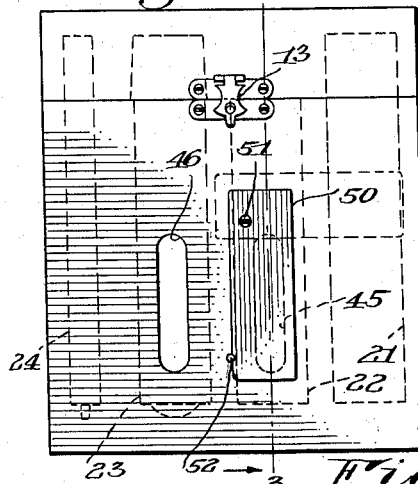
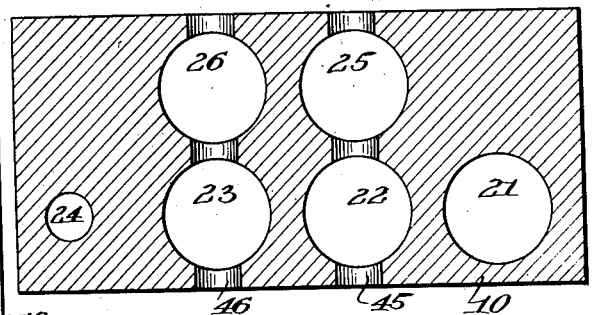
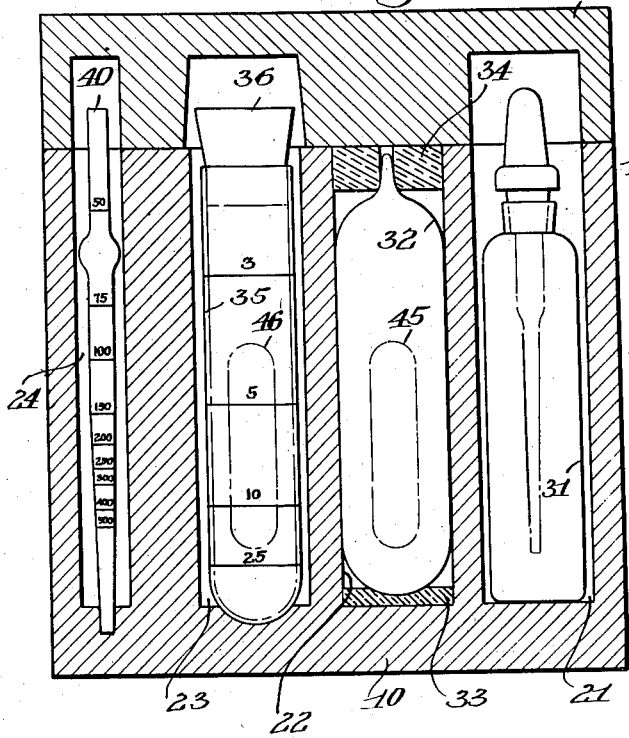
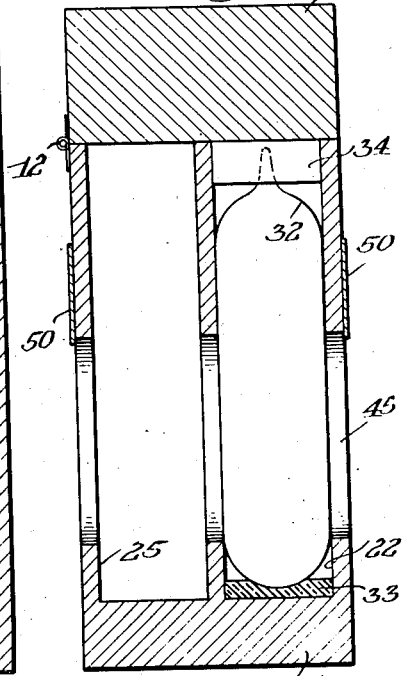
INVENTOR
Henry W. Lehmkuhl
BY Edward H. Cumpston
his ATTORNEY Patented Jan. 1, 1935

1,986,403

UNITED STATES PATENT OFFICE 1,986,403

METHOD FOR TESTING CHLORINE SOLUTIONS

Henry W. Lehmkuhl, Rochester, N. Y.

Application January 25, 1932, Serial No. 588,735

4 Claims. (Cl. 23—230)

This invention relates to a method and apparatus for testing solutions containing chlorine. An object of the invention is the provision of a simplified and more satisfactory method of testing such solutions, which is accurate, rapid, and easy to employ.

Another object of the invention is the provision of simplified and compact apparatus, sturdily constructed and of few parts, for testing chlorine solutions.

To these and other ends the invention resides in certain improvements and combinations of parts, all as will be hereinafter more fully described, the novel features being pointed out in the claims at the end of the specification.

In the drawing:

Fig. 1 is a front elevation of apparatus constructed in accordance with a preferred embodiment of the invention;

Fig. 2 is a vertical sectional view taken substantially centrally through the apparatus illustrated in Fig. 1;

Fig. 3 is a vertical sectional view taken substantially on the line 3—3 of Fig. 1, in a plane at right angles to the plane of Fig. 2, and Fig. 4 is a horizontal section through the case or block forming part of the apparatus.

The same reference numerals through the several views indicate the same parts.

Chlorine is widely used for the purification of water supplies, different concentrations of chlorine being employed for different purposes. The concentration is usually expressed in terms of parts per million, ordinarily abbreviated to P. P. M. In drinking water supplies, the chlorine concentration is usually about .02 to .2 P. P. M., in swimming pools it may run from 0.2 to 0.5 P. P. M., while in oyster purification it may be as high as 10 P. P. M. For the purification of milk equipment, the chlorine concentration in the wash water frequently runs from about 10 P. P. M. in the case of certain types of bottle washers to as high as 500 P. P. M. in the water for washing glass lined trucks and cars.

Where chlorination is praciced, daily checks on the chlorine concentration are usually made. In the method of testing which has usually been employed heretofore, especially for concentrations of 3 P. P. M. and higher, a quantity of the solution to be tested is taken, a color forming reagent such as ortho-tolidine is added thereto, and the resulting color is compared with a series of color standards of different concentrations so as to determine by color comparisons the concentration in the sample being tested. It is obvious that when this method is to be used for testing more than a single concentration of chlorine, a considerable number of different color standards are necessary. For example, a color standard of 3 P. P. M. may be provided, another one of 5 P. P. M., another of 10 P. P. M., another of 25 P. P. M. and so on. This prior method of testing has the further disadvantage that accurate testing is possible only for those concentrations for which color standards are available. Where the concentration being tested comes between the concentrations of the nearest two color standards, then the resulting color in the test sample would be of a depth between that of one color standard and that of another color standard, not accurately matching either one, so that accurate comparison is difficult. For example, if the water being tested is intended to have a concentration of 15 P. P. M. and the nearest available color standards are those of 10 P. P. M. and 25 P. P. M., it will be difficult to estimate by eye the proper color for 15 P. P. M. so as to test accurately for this concentration.

According to the new testing method of the present invention, however, a series of different color standards is not employed, but on the contrary only a single color standard is used for a considerable range of different concentrations. This color standard may be of a concentration equal to that of the least concentration in the range intended to be tested by the use of this one standard. Then instead of taking a fixed or a standard quantity of the solution to be tested, as is done according to the usual prior method above described, the present method contemplates the taking of a variable quantity of the solution to be tested, the quantity taken being inversely proportional to the supposed strength of the solution. The quantity of solution thus taken is then diluted by the addition of a suitable diluent such as plain water, to make up a predetermined standard quantity of dilute solution, and upon the addition of a suitable color forming reagent such as ortho-tolidine, the color produced in the dilute solution should be the same as that of the standard test sample. If the color is more intense, it is then known that the water being tested has more than the supposed concentration of chlorine therein, whereas if the color of the dilute solution is weaker than that of the color standard, it will be known that the concentration of the water being tested is less than that supposed.

In practice, it is found that a color standard made up in a concentration of 3 parts per million is satisfactory for testing samples having concentrations anywhere from 3 P. P. M. up to 500 P. P. M. or more.

To take a specific example, it will be assumed that the water being tested is intended to have a concentration of 10 P. P. M. of chlorine. The tube for holding the sample to be tested is not filled with a sample of the solution to be tested, as would ordinarily be done according to prior methods, but on the contrary only a relatively small quantity of the solution is placed in the tube which is preferably graduated directly in terms of parts per million. When the tube is thus graduated, it would be filled with the solution up to the graduation marked "10". The quantity of solution necessary to fill the tube to this graduation would be $\frac{3}{10}$ of the quantity needed to fill the tube all the way to the standard test quantity graduation. Then this solution is diluted by filling up the tube with water to the standard test quantity graduation, which may be marked "3". Then upon the addition of the ortho-tolidine or other suitable color forming reagent, the resulting color of the diluted sample should be the same as that of the single color standard made up in the known strength of 3 P. P. M.

If a quantity of water intended or supposed to have a concentration of 25 P. P. M., for example, were to be tested according to the method of the present invention, a still less quantity of the solution would be placed in the tube, and a still greater quantity of water would be necessary to bring the dilute solution up to the standard quantity graduation. The quantity of the solution used would be 3/25ths of the total quantity needed to fill the tube to the standard quantity graduation, and the remaining 22/25ths of this quantity would be the diluent. Then, as before, the addition of the color-forming reagent produces a color matching exactly with that of the single color standard. If the color is more intense, it would be known that the sample being tested had a concentration of greater than the desired or supposed 25 P. P. M., while if the color were lighter, it would be known that the water supply had less than 25 P. P. M. and steps could be taken in either event to rectify the condition.

It will be seen that the method of the present invention differs materially from the method commonly heretofore used in testing chlorine solutions, and renders unnecessary the series of different color standards which have heretofore been employed. According to the usual previous method, a fixed quantity of undiluted solution is compared with a series of different color standards. According to the method of the present invention, a variable quantity of the undiluted solution is diluted to form a fixed quantity of dilute solution, and this is then compared with only a single color standard. The amount of undiluted solution taken, in each instance, is the amount which, when diluted to the standard fixed test quantity, will form a solution of the same concentration as that of the single color standard employed. When the color standard has a concentration of 3 P. P. M., the fractional amount of undiluted solution to be taken is expressed by the fraction having 3 as its numerator and the supposed or intended strength of the water being tested, in P. P. M., as its denominator. Thus the quantity taken in each instance is approximately inversely proportional to the supposed strength of the solution, and may be spoken of in general and for convenience as inversely proportional thereto, although it is not exactly a strict arithmetical proportion.

The method of the present invention has the advantage over the usual prior method in that the test can be made more accurately, because slight changes in chlorine concentration at concentrations approximating 3 P. P. M. make a much more noticeable change in color than do similar changes in concentration at concentrations of say 25 or 50 or 100 P. P. M. The new method has a further important advantage that it can be used with reasonable accuracy for odd concentrations for which color standards are not ordinarily available according to the prior method. The tube in which the solution is placed and diluted according to the present method may be graduated as finely as desired, and even if the concentration being tested is of a strength for which no special graduation is provided, it is much easier and more accurate to estimate interpolations of quantity on a series of graduations than it is to estimate interpolations of color in a graduated series of colors.

Turning now to the drawing, a preferred embodiment of apparatus for carrying out the novel method of the present invention is illustrated in the accompanying drawing. Preferably there is provided a suitable convenient case or receptacle 10 which may be in the form of a wooden block having a cover 11 hinged thereto at 12 and secured in closed position when desired by a suitable latch 13.

Various vertical holes may be bored part way through the case 10, as shown particularly in Fig. 4, the holes in the front row being designated from right to left by the respective numerals 21, 22, 23, and 24. Two other holes 25 and 26 may be provided, directly behind the holes 22 and 23, respectively.

The first hole 21 in the front row of holes is intended to hold a suitable receptacle 31 containing the color forming reagent such as ortho-tolidine. This receptacle 31 may be in the form of bottle having a dropper associated with its stopper so that the desired quantity of reagent may be accurately measured and placed conveniently in the solution to be tested.

The next hole 22 contains a sealed tube or vial 32 containing the color standard. This color standard 32 is preferably mounted relatively permanently or fixedly in its cavity 22, although the other articles in the various other cavities are removable for use. For example, the tube 32 may rest upon a rubber cushion 33 and be held in place by a rubber stopper 34 substantially closing the top of the cavity 22.

In the preferred form of apparatus, intended for testing concentrations of 3 P. P. M. or higher, the color standard 32 is preferably a chlorine solution made up in the strength of 3 P. P. M. and colored with the desired standard quantity of color forming reagent such as ortho-tolidine.

The next cavity 23 contains removably placed therein the tube or vial 35, of glass or other suitable transparent material, in which the solution to be tested is placed. This tube is graduated preferably so as to read directly in terms of parts per million. For example, near the top of the tube there may be a graduation marked with the numeral "3", meaning 3 parts per million, which serves to indicate the point to which the tube should be filled with diluent after a lesser quantity of more concentrated solution has been placed in the tube. Further down the tube as plainly seen in Fig. 2, is a graduation marked with the numeral "5", and below that are others marked respectively "10" and "25", by way of example. The exact graduations shown in the drawing are only given as examples and obviously the tube in practice will be graduated as closely or with as many different graduations and numerals as may be desired, all of the graduations preferably reading directly in parts per million.

A cork 36 is provided for the tube 35 so that when a solution is to be diluted therein, the cork may be placed in the top after the diluent has been added so that the tube may be shaken up to produce a thorough mixture and a uniform diluted solution.

The last hole or cavity 24 of the front row may be of smaller size and contains a pipette 40 removably placed therein. This pipette likewise is graduated to read directly in parts per million and is used for measuring smaller quantities of more concentrated solutions which cannot be conveniently measured by the graduations on the tube 35. For example, the graduations of the pipette 40 may run from 50 to 500, as plainly shown in Fig. 2 of the drawing. If the solution being tested is intended or supposed to have a concentration of 200 P. P. M., for example, the pipette 40 will be filled with this solution only to the graduation 200 and this quantity will then be allowed to run from the pipette into the tube 35, which will then be filled up to the graduation 3 with a diluent such as plain water. This quantity thus measured in the pipette will be 3/200ths of the quantity necessary to fill the tube 35 up to the "3" graduation, as previously explained in connection with the method.

The case or block 10 is provided with a pair of sight or window openings 45 and 46, each in the form of relatively high and narrow horizontal slots extending through the case from front to back, as plainly shown in the drawing. The sight opening 45 intersects the openings or cavities 22 and 25, while the sight opening 46 intersects the cavities 23 and 26. When the sample to be tested has been diluted according to procedure above outlined and the desired standard quantity of color forming reagent has been placed therein, the case is held up to the light and the color visible through the sight opening 45 is compared ocularly with the color visible through the sight opening 46.

In order to prevent light from entering the sight opening 45 when the apparatus is not in use and from affecting the color standard 32, it is desirable to provide light excluding shutter means for this sight opening. Such shutter means, preferably at both the front and back ends of the opening 45, may comprise at each end a plate 50 of sheet metal or the like pivoted at 51 so that it may be swung aside to a non-obstructing position or may be swung down against the stop pin 52 to a position completely covering this associated end of the sight opening and excluding light therefrom. The open position of the shutter is shown in dotted lines in Fig. 1.

Where the solution being tested is turbid, it is desired to provide means for compensating for the turbidity so that it will not affect the test. This may be done by providing the two holes or cavities 25 and 26 of the rear row, each adapted to receive and hold a tube when desired. When the sample being tested is turbid, a plain tube filled with the turbid solution diluted to the same extent as the solution in the tube 35, but without any color forming reagent added, may be placed in the cavity 25 directly behind the color standard 32 in the cavity 22. A similar tube filled with distilled water or other suitable non-turbid water may be placed in the cavity 26 directly behind the tube 35 containing the solution to be tested in the cavity 23. Thus the tubes placed within the cavities 25 and 26 will compensate for the turbidity of the liquid, since in sighting through the sight opening 45 one will see light coming through one turbid tube and one non-turbid tube, and in sighting through the sight opening 46 one will likewise see light coming through one turbid tube and one non-turbid tube. In this way the turbidity is counterbalanced and its effect in changing the color of the test sample is eliminated.

The use of the apparatus has already been explained in a general way in connection with the description of the method, but will now be explained more in detail by the use of a specific example.

Assuming that the water to be tested is intended to have a chlorine concentration of 25 P. P. M., the tube 35, after being properly cleaned, is filled with the solution to be tested only to the graduation mark 25. Then sufficient plain water is added to the tube 35 to fill it to the graduation mark 3. The desired quantity of color forming reagent such as orthotolidine from the bottle 31 is then added, the stopper 36 is placed in the mouth of the tube 35 and the tube is thoroughly shaken to mix the solution, the diluent, and the reagent thoroughly with each other. The tube is then reinserted in its cavity 23, the shutters 50 are moved aside, and the color visible through the sight opening 46 is compared with that visible through the sight opening 45. If the solution being tested is not turbid, the cavities 25 and 26 in the case may remain empty, but if the solution is turbid, then compensating tubes will be placed in these cavities 25 and 26 as previously explained.

If the color visible through the sight opening 46 matches exactly with the color visible through the sight opening 45, it will be known that the solution being tested contains exactly the desired and supposed amount of 25 P. P. M. If the color through the opening 46 is deeper, however, it will be known that more than 25 P. P. M. are present in the solution, whereas if the color through the opening 46 is lighter than that through the opening 45, it will be known that the chlorine concentration of the supply being tested is less than 25 P. P. M. Steps can then be taken to diminish or increase the chlorine concentration in the water supply, as may be necessary.

Taking another example, if the supply to be tested is intended to have a concentration of, say, 75 P. P. M., the pipette 40 may be filled with the solution only to the graduation marked 75, and the quantity of solution thus measured in the pipette may be allowed to run into the empty tube 35. Then diluent is added to this tube to fill it up to the graduation 3, the color forming reagent is added, the tube is thoroughly shaken up, and the rest of the procedure is exactly the same as the preceding example.

The use of a pipette in conjunction with the graduation on the tube itself greatly increases the range of concentrations for which the apparatus may be employed, as will be obvious from what has been said.

The color standard 32 and sample holding tube 35 are preferably of relatively large diameter, greater than the diameter of the tubes usually employed in prior testing apparatus, so that a better depth of color is secured. Of course the tubes 32 and 35 and the turbidity tubes placeable in the cavities 25 and 26 should all be of the same diameter.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The method of testing chlorine solutions of different strengths which comprises selecting of each solution to be tested a known quantity varying approximately inversely proportionally to the supposed strength of the solution, adding a quantity of diluent sufficient to increase the volume of the sample to a predetermined standard volume, subsequently adding ortho-tolidine to the diluted solution, and comparing the resulting color with that of a color standard which has been standardized in terms of chlorine.

2. The method of testing a chlorine solution having a supposed strength greater than a predetermined chlorine strength indicated by a certain color standard standardized in terms of chlorine, which comprises diluting a known quantity of the solution to be tested in proportion to the excess of its supposed strength over the known strength indicated by said color standard, adding a color forming reagent to the diluted solution, and comparing the resulting color of the diluted solution with the color of said color standard to determine whether the actual strength of the tested solution was equal to, greater than, or less than its supposed strength on the basis of which it was diluted.

3. The method of testing a chlorine solution having a supposed strength greater than a predetermined chlorine strength indicated by a certain color standard standardized in terms of chlorine, which comprises selecting a known quantity of the solution to be tested, said known quantity for different strengths of solutions varying inversely to the supposed strength of the solution to be tested, diluting said quantity to a definite volume, adding a color forming reagent, and comparing the resulting color of the diluted solution with the color of said color standard.

4. The method of testing chlorine solutions which comprises selecting a known quantity of the solution to be tested varying inversely proportionally to the supposed strength of the solution, adding sufficient diluent to produce a fixed standard quantity of dilute solution having a supposed strength equal to that indicated by a color standard designed to indicate a predetermined strength of chlorine solution, adding a color forming reagent, and comparing the resulting color of the dilute solution with that of said color standard.

HENRY W. LEHMKUHL.